(12) United States Patent
Burnett

(10) Patent No.: US 7,020,274 B1
(45) Date of Patent: Mar. 28, 2006

(54) UNIVERSAL APPARATUS AND METHOD FOR INTERFACING SIGNALS WITH TELEPHONY NETWORKS

(75) Inventor: Charles J Burnett, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/559,165

(22) Filed: Apr. 26, 2000

(51) Int. Cl.
H04M 1/00 (2006.01)
H04M 9/00 (2006.01)
H04M 11/00 (2006.01)

(52) U.S. Cl. .............. 379/387.02; 379/377; 379/386; 379/394; 379/399.01; 379/404; 379/93.05

(58) Field of Classification Search .......... 379/387.02, 379/399.01, 413.02, 394, 93.01, 93.06, 93.07, 379/93.09, 93.14, 93.15, 93.34, 93.05, 377, 379/386, 404; 375/222
See application file for complete search history.

(56) References Cited

U.S. PATENT DOCUMENTS

| | | | | |
|---|---|---|---|---|
| 4,939,511 A | * | 7/1990 | Hinckley | 340/825.78 |
| 5,177,676 A | | 1/1993 | Inam et al. | 363/80 |
| 5,430,793 A | * | 7/1995 | Ueltzen et al. | 379/93.29 |
| 5,459,787 A | | 10/1995 | Tomasini et al. | 379/398 |
| 5,475,327 A | | 12/1995 | Wu et al. | 327/308 |
| 5,598,467 A | * | 1/1997 | Bremner et al. | 379/398 |
| 5,712,977 A | * | 1/1998 | Glad et al. | 379/93.01 |
| 5,802,169 A | * | 9/1998 | Frantz et al. | 379/398 |
| 5,862,458 A | | 1/1999 | Ishii | 455/107 |
| 5,921,815 A | | 7/1999 | Brunker et al. | 439/636 |
| 5,953,409 A | * | 9/1999 | Carlsen | 379/394 |
| 6,081,586 A | * | 6/2000 | Rahamim et al. | 379/93.29 |
| 6,091,713 A | * | 7/2000 | Lechleider et al. | 370/248 |
| 6,091,806 A | * | 7/2000 | Rasmus et al. | 379/93.29 |
| 6,128,373 A | * | 10/2000 | Mathe et al. | 379/93.29 |
| 6,181,792 B1 | * | 1/2001 | Derby et al. | 379/398 |
| 6,185,280 B1 | * | 2/2001 | Jarboe et al. | 379/3 |
| 6,192,109 B1 | * | 2/2001 | Amrany et al. | 379/30 |
| 6,198,817 B1 | * | 3/2001 | Derby et al. | 379/394 |
| 6,553,117 B1 | * | 4/2003 | Armistead et al. | 379/398 |
| 6,611,580 B1 | * | 8/2003 | Dahan et al. | 379/93.29 |
| 6,625,278 B1 | * | 9/2003 | Hendricks et al. | 379/398 |
| 6,639,983 B1 | * | 10/2003 | Kielty et al. | 379/399.01 |
| 6,904,144 B1 | * | 6/2005 | Patel | 379/394 |
| 2003/0076945 A1 | * | 4/2003 | Huang et al. | 379/387.01 |

OTHER PUBLICATIONS

"Chapter 18; Digital Signal Processing," The ARRL Handbook for Radio Amateurs, Ed. R. Dean Straw, 77th Ed., 1999, pp. 18.1-18.13.

* cited by examiner

Primary Examiner—Binh K. Tieu

(57) ABSTRACT

A communication apparatus is used to interface signals with any one of a plurality of telephony networks having different impedances. The apparatus includes memory, a processor, a digital-to-analog (D/A) converter, and an interface port. Different sets of impedance control values are stored in the memory. The processor is configured to select one of the sets of impedance control values and to serially transmit the selected set of impedance control values during a communication session. The D/A converter is configured to receive the selected set of impedance control values from the processor and to transmit analog signals based on the selected set of impedance control values. The interface port is configured to interface signals with a communication connection of a telephony network. Based on the analog signals transmitted by the D/A converter, the interface port simulates an impedance such that the simulated impedance substantially matches an impedance of the telephony network as measured from the communication connection.

19 Claims, 3 Drawing Sheets

US 7,020,274 B1

UNIVERSAL APPARATUS AND METHOD FOR INTERFACING SIGNALS WITH TELEPHONY NETWORKS

BACKGROUND OF THE INVENTION

1. Field of the Invention

The present invention generally relates to telephony communication techniques and, in particular, to a universal apparatus and method for interfacing signals with telephony networks that have different impedance characteristics.

2. Related Art

Telephony networks have been employed for many years to communicate voice and data signals across great distances. However, the impedance characteristics (e.g., AC line impedance, network balance impedance, DC line impedance, ringer impedance, etc.) of telephony networks unfortunately vary, sometimes significantly, from network-to-network. For example, the impedance characteristics of a telephony network in one country may be significantly different than the impedance characteristics of a telephony network in another country.

In this regard, an acceptable range of impedance characteristics of a telephony network is often regulated by the country in which the telephony network resides, such that any other telephony network in the same country should have similar impedance characteristics. However, the acceptable range of impedance characteristics varies from country-to-country. As a result, a telephony communication device (such as a telephone, modem, etc.) compatible with a telephony network in one country may not be compatible with a telephony network in another country, and successfully interfacing the communication device with a telephony network may only occur in one country or in a particular set of countries.

Due to the different impedance characteristics of telephony networks in different countries, manufacturers of telephony communication devices usually design the interface ports of communication devices on a country-by-country basis. In this regard, a manufacturer may design the interface port of a communication device assuming that the communication device will be interfaced with a telephony network having impedance characteristics within a particular range, as defined by the laws of a particular country. Typically, the communication device is then only sold in the particular country or in another country promulgating a similar range of impedance characteristics for telephony networks. If a user tries to use the communication device in a different country that promulgates a significantly different range of impedance characteristics for the telephony networks in that country, then it is likely that the communication device will not be operable. As a result, the use of each communication device produced by a manufacturer is usually limited to use within a particular country or to a particular set of countries having telephony networks with similar impedance characteristics.

SUMMARY OF THE INVENTION

The present invention overcomes the inadequacies and deficiencies of the prior art as discussed hereinbefore. Generally, the present invention provides a universal apparatus and method for interfacing signals with telephony networks that have different impedance characteristics.

In architecture, the present invention includes memory, a processor, a digital-to-analog (D/A) converter, and an interface port. Different sets of impedance control values are stored in the memory. The processor is configured to select one of the sets of impedance control values and to serially transmit the selected set of impedance control values during a communication session. The D/A converter is configured to receive the selected set of impedance control values from the processor and to transmit analog signals based on the selected set of impedance control values. The interface port is configured to interface signals with a communication connection of a telephony network. Based on the analog signals transmitted by the D/A converter, the interface port simulates an impedance such that the simulated impedance substantially matches an impedance of the telephony network as measured from the communication connection.

The present invention can also be viewed as providing a method for communicating with telephony networks. The method can be broadly conceptualized by the following steps: providing an interface port; interfacing the interface port with a communication connection of a telephony network; transmitting analog signals to the interface port, the analog signals having voltages; varying the voltages of said analog signals; and causing the interface port to continuously simulate a particular impedance during a communication session in response to the analog signals.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The present invention generally provides an apparatus and method for interfacing signals with telephony networks that may have different impedance characteristics. To illustrate the principles of the present invention, refer to FIG. 1, which depicts a telephony communication system 15 in accordance with the present invention.

Figure 1:
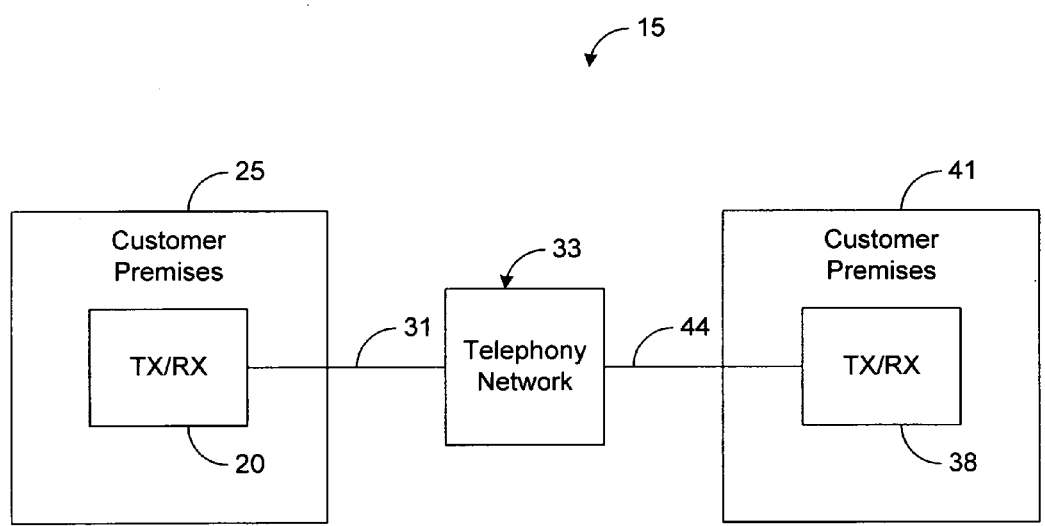
FIG. 1 is a block diagram illustrating a telephony communication system in accordance with the present invention.

As shown by FIG. 1, a communication apparatus or device 20, such as a telephone or modem, for example, residing at a customer premises 25 is coupled to a communication channel 31, such as a subscriber loop, for example, of a conventional telephony network 33. The communication device 20 is designed to transmit and/or receive signals via connection 31 in communicating with telephony network 33. In this regard, a communication session is often established between communication device 20 and another communication device 38 at another premises 41, and during the communication session, signals are communicated between communication devices 20 and 38 via telephony network 33, including communication connections 31 and 44.

For successful communication with telephony network 33, the impedance characteristics exhibited by communication device 20 should substantially match the impedance characteristics of the network 33. However, as previously set forth, the impedance characteristics of network 33 may be significantly different than other telephony networks. Therefore, although the communication device 20 may be compatible for direct interfacing with the network 33 shown by FIG. 1, the communication device 20 may be incompatible for direct interfacing with other telephony networks.

To increase the number of networks 33 compatible with communication device 20, the communication device 20 preferably allows its impedance characteristics to be dynamically controlled. Therefore, the communication device 20 can be directly and successfully interfaced with any one of a plurality of telephony networks 33 having significantly different impedance characteristics.

Figure 2:
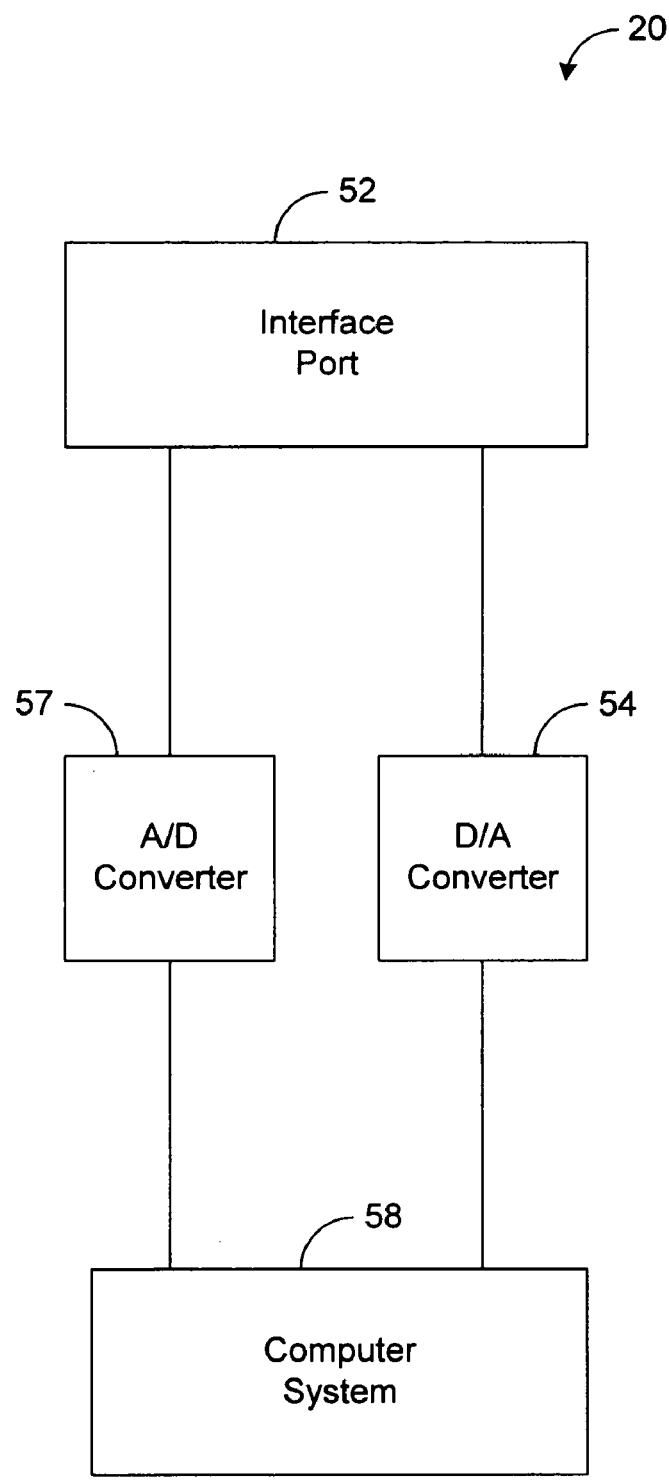
FIG. 2 is a block diagram illustrating a more detailed view of a communication device depicted in FIG. 1.

FIG. 2 depicts a more detailed view of the communication device 20. As seen by FIG. 2, the communication device 20 includes an interface port 52, a digital-to-analog (D/A) converter 54, an analog-to-digital (A/D) converter 57, and a computer system 58. The interface port 52 includes hardware, including circuitry, for interfacing signals with the communication connection 31 (FIG. 1). As an example, the interface port 52 may be adapted to interface with a RJ-11 or RJ-45 jack, which typically terminates communication connection 31.

Signals to be communicated to communication device 38 (FIG. 1) are transmitted to D/A converter 54 by computer system 58. The D/A converter 54 is configured, via conventional techniques, to convert these signals from digital to analog so that the signals are compatible with communication connection 31, which is typically analog for most telephony networks 33. The analog signals are transmitted from the D/A converter 54 to interface port 52, which interfaces these signals with communication connection 31. The signals are then transmitted across telephony network 33 to communication device 38.

Signals received by the interface port 52 from communication connection 31 are transmitted to A/D converter 57, which converts the signals into digital data and transmits the digital data to computer system 58. Then, the computer system 58 further processes this digital data, as desired. For example, the digital data may be converted into sound so that the user at premises 25 may hear the sound defined by the signals received from connection 31. Alternatively, the digital data may be rendered via a display device. It should be apparent to one skilled in the art that other types of processing may be performed on the foregoing digital data defined by the signals received from connection 31.

Figure 3:
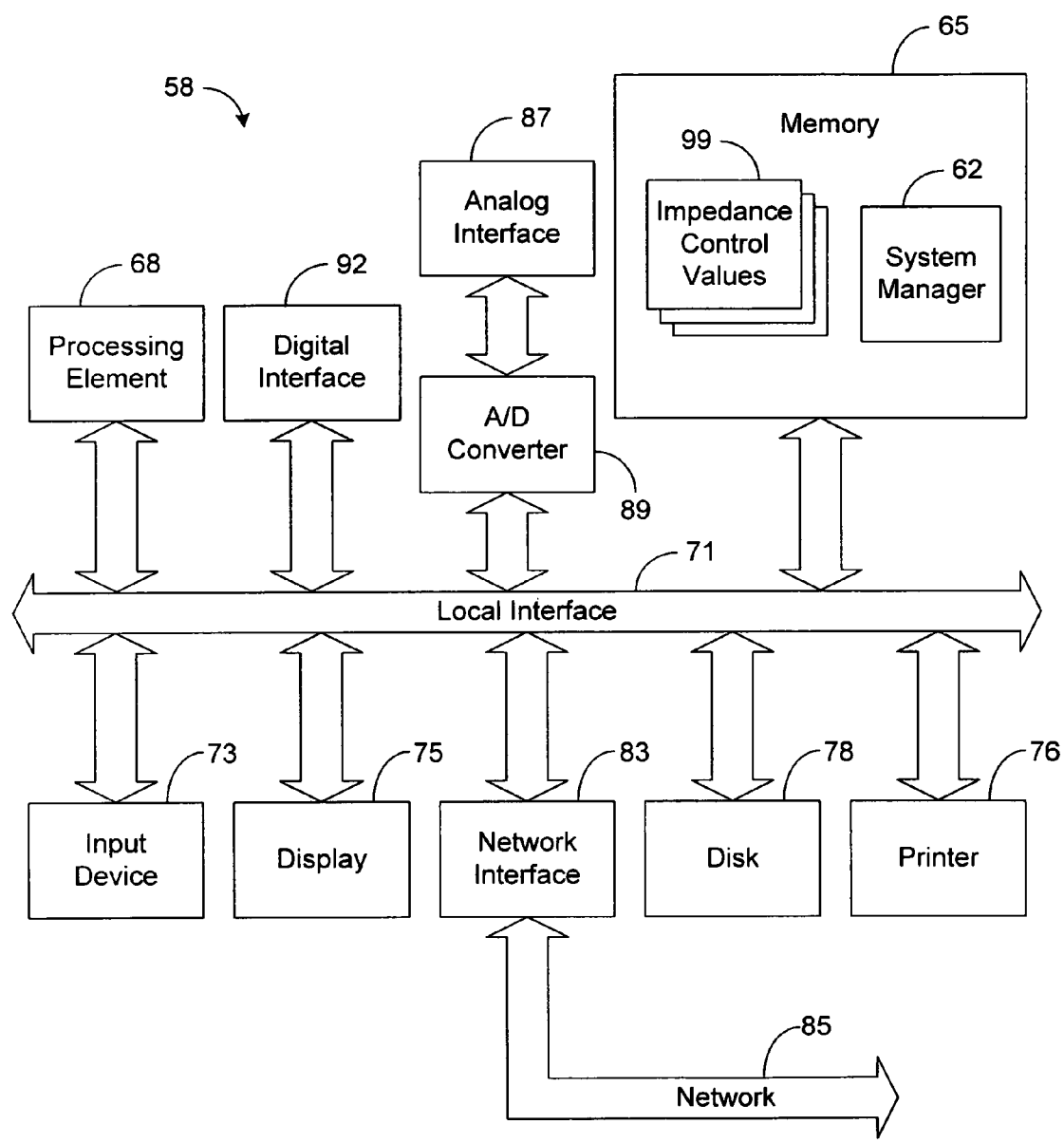
FIG. 3 is a block diagram illustrating a more detailed view of a computer system depicted in FIG. 2.

FIG. 3 depicts a more detailed view of the computer system 58. As seen by FIG. 3, the computer system 58 includes a system manager 62 for controlling the operation of the system 58. The system manager 62 can be implemented in software, hardware, or a combination thereof. In the preferred embodiment, the system manager 62 of the present invention along with its associated methodology is implemented in software and stored in computer memory 65.

Note that the system manager 62, when implemented in software, can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the system manager 62 may be magnetically stored and transported on a conventional portable computer diskette.

The preferred embodiment of the computer system 58 of FIG. 3 comprises one or more conventional processing elements 68, such as a digital signal processor (DSP), that communicate to and drive the other elements within the system 58 via a local interface 71, which can include one or more buses. Furthermore, an input device 73, for example, a keyboard or a mouse, can be used to input data from a user of the system 58, and screen display 75 or a printer 76 can be used to output data to the user. A disk storage mechanism 78 can be connected to the local interface 71 to transfer data to and from a nonvolatile disk (e.g., magnetic, optical, etc.). The system 58 can be connected to a network interface 83 that allows the system 58 to exchange data with a network 85.

To enable the communication of voice signals and other types of analog signals, the computer system 58 includes an analog interface 87 configured to receive analog signals and to transmit the analog signals to an A/D converter 89. The A/D converter 89 is configured to convert these analog signals into digital signals and to transmit the digital signals over local interface 71 to other elements in the system 58. Therefore, the signals transmitted from communication device 20 to communication device 38 can be entered into the communication device 20 digitally via input device 73, network 85, and/or disk storage mechanism 78 or can be entered into the communication device 20 as analog signals via analog interface 87.

The D/A converter 54 (FIG. 2) is preferably coupled to a digital interface 92 of system 58. Therefore, when the communication device 20, via one of the interfaces 73, 78, 83, or 87, receives information to be transmitted to communication device 38, the computer system 58 transmits this information to digital interface 92, and from digital interface 92, the information is eventually transmitted across telephony network 33 to communication device 38. If desired, the computer system 58 may store the foregoing information in memory 65 or other location before transmitting the information to digital interface 92.

It is generally known that a desired impedance for a circuit may be simulated by varying the voltage produced by the circuit's voltage source according to a predetermined algorithm. For example, "Digital Signal Processing," *The*

*ARRL Handbook for Radio Amateurs*, Seventy-Seventh Ed., The National Association for Amateur Radio, 1999, which is incorporated herein by reference, describes such a process for simulating a desirable circuit impedance. In the preferred embodiment, the computer system 58 is configured to control the signals transmitted to interface port 52, such that the interface port 52 simulates an impedance that substantially matches the impedance characteristics of the network 33 presently interfaced with the communication device 20.

In this regard, at least one set of impedance control values 99 is preferably stored in memory 65, as shown by FIG. 3. When serially transmitted to interface port 52 via D/A converter 54, the set of control values 99 are converted into analog signals. The values of the impedance control values 99 are such that the voltages of the analog signals output by D/A converter 54 vary to cause the interface port 52 to simulate an impedance similar to the impedance characteristics of network 33. Therefore, successful communication between the interface port 52 and network 33 is enabled. Furthermore, during a communication session between communication devices 20 and 38, the computer system 58 (via execution of the system manager 62 by the processing element 68) is designed to continuously transmit the foregoing set of control values 99, and as a result, the communication device 20 should continuously exhibit an impedance that substantially matches the impedance characteristics of the network 33.

As previously set forth, during the communication session, the communication device 20 is likely to receive information that is to be transmitted to communication device 38. For example, the analog interface 87 may receive analog signals, which are converted into digital data by A/D converter 89 and which contain information to be transmitted to communication device 38. The system manager 62 is configured to combine (e.g., add) the digital data defining the foregoing information with the digital data from the aforementioned set of impedance control values 99 being continuously transmitted through D/A converter 54 to interface port 52. Therefore, the analog signal produced by the D/A converter 54 represents superimposition of the digital data defining the foregoing information to be transmitted to communication device 38 with the digital data defining the aforementioned set of analog signals derived from impedance control values 99. Even when superimposed with another analog signal, the analog signals derived from the set of impedance control values 99 should cause the interface port 52 to exhibit the same simulated impedance.

To enable the communication device 20 to directly interface with any one of a plurality of networks 33 having substantially different impedance characteristics, the communication device 20 preferably stores a plurality of impedance value sets 99 in memory 65. Each of the sets of impedance values 99, when transmitted as analog signals to interface port 52 via D/A converter 54, causes the interface port 52 to simulate a different impedance. Therefore, by selecting the appropriate set of impedance control values 99 that causes the interface port 52 to simulate an impedance that substantially matches the impedance of the network 33 presently interfaced with the communication device 20, it is possible to successfully interface the communication device 20 with the network 33.

In this regard, each set of impedance control values 99, when transmitted to interface device 20, as described above, causes the interface port 52 to exhibit a different impedance. Therefore, a user preferably enters inputs via input device 73 to select the set of impedance control values 99 that causes the interface port 52 to exhibit impedance characteristics that substantially match the impedance characteristics of the network 33 presently coupled to the communication device 20, as shown by FIG. 1. In response, the system manager 62 selects the set of impedance control values 99 identified by the user's inputs, and during a communication session with communication device 38, the system manger 62 continuously and serially transmits the selected set of impedance control values 99 to interface port 52 via D/A converter 54.

If at some point, the communication device 20 is coupled to a different network 33 having substantially different impedance characteristics, the user may select a different set of impedance control values 99, which preferably causes the interface port 52 to exhibit substantially similar impedance characteristics as the different network 33. In response, the system manger 62 continuously transmits the newly selected set of impedance control values 99 to interface port 52 via D/A converter 54, such that the communication device 20 is successfully interfaced with the network 33 presently coupled to the communication device 20. In this way, the communication device 20 can be successively and successfully interfaced with many different networks 33 having substantially different impedance characteristics.

It should be noted that it may be possible to automatically detect the impedance characteristics of the network 33 coupled to the communication device 20. Therefore, the step of the user selecting the appropriate set of impedance control values 99 is not necessary. In this regard, before a communication session is initiated, the system manager 62 may be configured to automatically detect the impedance characteristics of the network 33 coupled to the communication device 20. In this embodiment, the memory 65 may include a table indicating which set of impedance control values 99 should be selected based on the impedance characteristics detected by the system manager 62. Therefore, after detecting the impedance characteristics of the network 38, the system manager 62 may consult the table to determine the appropriate set of impedance values 99 that should be selected to enable successful communication with the network 33.

OPERATION

The preferred use and operation of the communication device 20 and associated methodology are described hereafter.

Initially, sets of impedance values 99 for enabling the interfacing of the communication device 20 with different telephony networks 33 having substantially different impedance characteristics are determined via calculation or empirical analysis. These sets of impedance values 99 are stored in memory 65. Then, a user connects the communication device 20 to network 33. Preferably, the user is aware of the impedance characteristics of the network 33 and of which of the sets of impedance control values 99, when transmitted as analog signals to interface port 52, causes the interface port 52 to exhibit impedance characteristics matching the impedance characteristics of the network 33. The user, via input device 73, enters inputs identifying the foregoing set of impedance control values 99.

At some point, a communication session between communication devices 20 and 38 is established via conventional techniques. During the communication session, the system manager 62, via execution by the processing element 68, serially transmits the selected set of impedance control values 99 to D/A converter 54. In the preferred embodiment, the system manager 62 continuously transmits, via digital interface 58, this serial stream of data for the duration of the communication session so that the communication device 20 is successfully interfaced with the network 33 during the entire communication session.

During the communication session, the user may want to transmit digital data from the computer system 58 to the communication device 38. As an example, this digital data may be from analog signals interfaced with the computer system 58 via analog interface 87 (and converted into digital data by A/D converter 89) before or during the communication session and/or may be from digital signals interfaced with the computer system 58 via interfaces 73, 83, and/or 78. When the foregoing digital data is to be transmitted to the communication device 38 by computer system 58, the system manager 62 is configured to combine (e.g., add) the digital data with the data from the selected set of impedance control values 99 being continuously transmitted by the computer system 58.

The data transmitted by digital interface 58 during the communication session is received by D/A converter 54, which converts the data into analog signals and transmits the analog signals to interface port 52. The analog signals are then interfaced with communication connection 31 via the interface port 52. Due to the inclusion of the selected set of impedance control values 99 in the data transmitted to the D/A converter 54, the interface port 52 should continuously simulate impedance characteristics that substantially match the impedance characteristics of the network 38 (assuming the appropriate set of impedance control values has been selected). Therefore, the interface port 52 should be able to successfully transmit signals across communication connection 31.

Note that since the impedance of the interface port 52 should match the impedance of the network 33, the interface port 52 may successfully receive signals from communication connection 31 as well. These signals are transmitted to computer system 58 via A/D converter 57, which converts the received signals into digital signals. These digital signals are received by digital interface 58 and further processed by the computer system 58, as desired.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

What is claimed is:

1. A communication apparatus communicating with telephony networks, comprising:
   memory storing sets of impedance control values respectively simulating a plurality of circuit impedances;
   a processor configured to:
      automatically detect an impedance characteristic of a telephony network to which the communication apparatus is connected;
      automatically select one of said sets of impedance control values based on said detected impedance characteristic; and
      combine data to be transmitted over said telephony network with said selected set of impedance control values;
   a digital-to-analog converter that converts the combined data and said selected set of impedance control values into analog signals; and
   an interface port connected to said telephony network that transmits the output of the digital-to-analog converter over the telephony network, wherein the impedance required by the telephony network is simulated based on the selected set of impedance control values.

2. The communication apparatus of claim 1, wherein said processor is configured to continuously transmit said selected set of impedance control values during said communication session.

3. The communication apparatus of claim 1, further comprising an input device configured to receive an input from a user, said processor configured to select said selected set of impedance control values based on said input.

4. The communication apparatus of claim 1, wherein said processor is further configured to identify, based on said detected impedance characteristic, which of said sets of impedance control values, when converted to analog signals and transmitted to said interface port, causes said interface port to simulate said impedance that substantially matches said impedance of said telephony network.

5. The communication apparatus of claim 4, wherein each of said sets of impedance control values, when converted to analog signals and transmitted to said interface port, causes said interface port to simulate a different impedance.

6. The communication apparatus of claim 1, wherein the impedance characteristic of the telephony network to which the communication apparatus is connected comprises at least one of an AC line impedance, a network balance impedance, a DC line impedance, or a ringer impedance.

7. A communication apparatus communicating with telephony networks, comprising:
   means for storing sets of impedance control values used for simulating a plurality of circuit impedances;
   means for automatically detecting an impedance characteristic of a telephony network to which the communication apparatus is connected;
   means for automatically selecting one of said sets of impedance control values based on said detected impedance characteristic;
   means for combining data to be transmitted over said telephony network with said selected set of impedance control values;
   means for converting said combined data and said selected set of impedance control values into analog signals; and
   means for transmitting said analog signals over said telephony network, wherein the impedance required by the telephony network are simulated based on the selected set of impedance control values.

8. The communication apparatus of claim 7, wherein said transmitting means continuously transmits said selected set of impedance control values during said communication session.

9. The communication apparatus of claim 7, further comprising a means for receiving an input from a user, said selecting means configured to select said selected set of impedance control values based on said input.

10. The communication apparatus of claim 7, wherein the impedance characteristic of the telephony network to which the communication apparatus is connected comprises at least one of an AC line impedance, a network balance impedance, a DC line impedance, or a ringer impedance.

11. A method for communicating with telephony networks, comprising the operations of:
   providing an interface port;
   interfacing said interface port with a communication connection of a telephony network;

storing sets of impedance control values used for simulating a plurality of circuit impedances;

automatically detecting an impedance characteristic of the telephony network to which the interface port is interfaced;

automatically selecting one of said sets of impedance control values based on said detected impedance characteristic;

combining data to be transmitted over said telephony network with said selected set of impedance control values;

converting said combined data and said selected set of impedance control values into analog signals;

transmitting said analog signals over the telephony network; and simulating the impedance required by the telephony network based on the selected set of impedance control values.

12. The method of claim 11, further comprising the operations of:

receiving an input; and performing said selecting operation based on said input.

13. The method of claim 11, further comprising the operations of:

interfacing said interface port with a communication connection of another telephony network;

automatically detecting an impedance characteristic of said other telephony network;

automatically selecting another of said sets of impedance control values based on said another detected impedance characteristic;

serially transmitting said other selected set of impedance control values to said digital-to-analog converter;

converting, at said digital-to-analog converter, said other set of impedance control values into other analog signals;

simulating another impedance at said interface port based on said other analog signals; and performing said automatically selecting another of said sets of impedance control values operation such that said other impedance substantially matches said impedance of said other telephony network as measured from said other communication connection.

14. The communication apparatus of claim 11, wherein the impedance characteristic of the telephony network to which the interface port is connected comprises at least one of an AC line impedance, a network balance impedance, a DC line impedance, or a ringer impedance.

15. A method for communicating with telephony networks, comprising the operations of:

providing an interface port;

interfacing said interface port with a communication connection of a telephony network;

automatically detecting an impedance characteristic of said telephony network;

transmitting analog signals to said interface port, said analog signals having voltages;

automatically varying said voltages of said analog signals such that said interface port continuously simulates said detected impedance during a communication session in response to said analog signals; and combining values from said selected set of impedance control values with data that is to be communicated from said interface port to a remote communication device.

16. The method of claim 15, further comprising the operations of:

storing sets of impedance control values;

automatically selecting one of said sets of impedance control values based on said detected impedance characteristic;

serially and continuously transmitting said selected set of impedance control values to a digital-to-analog converter during said communication session;

producing said analog signals at said digital-to-analog converter; and performing said automatically varying operation based on said selected set of impedance control values.

17. The method of claim 16, further comprising the operations of:

receiving an input; and performing said automatically selecting operation based on said input.

18. The method of claim 16, further comprising the operations of:

interfacing said interface port with a communication connection of another telephony network;

automatically detecting an impedance characteristic of said other telephony network;

transmitting other analog signals to said interface port, said other analog signals having other voltages;

automatically varying said other voltages of said other analog signals;

causing said interface port to continuously simulate a particular impedance during another communication session in response to said other analog signals;

selecting another of said sets of impedance control values based on said detected impedance characteristic of said other telephony network;

serially and continuously transmitting said other selected set of impedance control values to said digital-to-analog converter during another communications session;

producing said other analog signals at said digital-to-analog converter; and performing said automatically varying said other voltages operation based on said other selected set of impedance control values.

19. The communication apparatus of claim 15, wherein the impedance characteristic of the telephony network comprises at least one of an AC line impedance, a network balance impedance, a DC line impedance, or a ringer impedance.

* * * * *